(12) United States Patent
Clarke et al.

(10) Patent No.: US 12,550,618 B2
(45) Date of Patent: Feb. 10, 2026

(54) RECONFIGURABLE ELECTRICALLY CONTROLLED SHAPE MORPHING DIELECTRIC ELASTOMER DEVICE

(71) Applicant: President and Fellows of Harvard College, Cambridge, MA (US)

(72) Inventors: David Clarke, Cambridge, MA (US); Ehsan Hajiesmaili, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 835 days.

(21) Appl. No.: 16/961,175

(22) PCT Filed: Jan. 11, 2019

(86) PCT No.: PCT/US2019/013220
§ 371 (c)(1),
(2) Date: Jul. 9, 2020

(87) PCT Pub. No.: WO2019/140209
PCT Pub. Date: Jul. 18, 2019

(65) Prior Publication Data
US 2021/0057632 A1 Feb. 25, 2021

Related U.S. Application Data

(60) Provisional application No. 62/616,739, filed on Jan. 12, 2018.

(51) Int. Cl.
*H10N 30/87* (2023.01)
*H10N 30/50* (2023.01)
*H10N 30/857* (2023.01)

(52) U.S. Cl.
CPC ........... *H10N 30/871* (2023.02); *H10N 30/50* (2023.02); *H10N 30/857* (2023.02)

(58) Field of Classification Search
CPC ..... H10N 30/871; H10N 30/50; H10N 30/857
(Continued)

(56) References Cited

U.S. PATENT DOCUMENTS 3,816,774 A * 6/1974 Ohnuki ................ B06B 1/0688
310/369
5,977,685 A 11/1999 Kurita et al.
(Continued)

FOREIGN PATENT DOCUMENTS

EP          1471373 A2 * 10/2004 ........... G02B 5/1828
WO   WO-2015077830 A1 *  6/2015 ........... B06B 1/0223

OTHER PUBLICATIONS

Jang Ho Park, Saurabh Nair, Daewon Kim, Numerical analysis of helical dielectric elastomer actuator, Apr. 17, 2017, Proceedings vol. 10163, Electroactive Polymer Actuators and Devices (EAPAD) 2017; 101631A (2017) (Year: 2017).*

(Continued)

*Primary Examiner* — J. San Martin
(74) *Attorney, Agent, or Firm* — Wolf, Greenfield & Sacks, P.C.

(57) ABSTRACT

An electrically-controllable shape morphing device comprising a multi-layer structure including a plurality of elastomer layers and a plurality of electrode layers formed between the plurality of elastomer layers. A geometry and/or size of at least one electrode in a first layer of the plurality of electrode layers is different than a geometry and/or size of at least one other electrode in a second layer of the plurality of electrode layers. Each of the plurality of electrode layers is individually addressable such that the electrode layer is configured to receive a variable voltage. The multi-layer structure is configured to change shape from a first shape to a second shape when a differential voltage is applied between electrodes in the plurality of electrode layers. The device may further comprise stiffening elements attached on (Continued)

or within elastomer layers to locally alter mechanical stiffness of the elastomer layers in at least one direction.

18 Claims, 14 Drawing Sheets

(58) Field of Classification Search
USPC .................................................. 310/367, 800
See application file for complete search history.

(56) References Cited

U.S. PATENT DOCUMENTS

| | | |
|---|---|---|
| 7,411,331 B2 | 8/2008 | Dubowsky et al. |
| 2013/0215079 A1 | 8/2013 | Johnson et al. |
| 2013/0301113 A1* | 11/2013 | Pellegrino ......... C04B 35/62218 |
| | | 359/298 |
| 2015/0173604 A1* | 6/2015 | Wheatley ............... G02B 23/26 |
| | | 600/478 |
| 2018/0277740 A1* | 9/2018 | Kim ..................... H10N 30/857 |
| 2020/0185590 A1* | 6/2020 | Malhotra ............... H10N 30/80 |

OTHER PUBLICATIONS

International Search Report and Written Opinion in connection with International Application No. PCT/US2019/013220, mailed Apri 8, 2019.
International Preliminary Report on Patentability in connection with International Application No. PCT/US2019/013220, mailed Jul. 23, 2020.

* cited by examiner

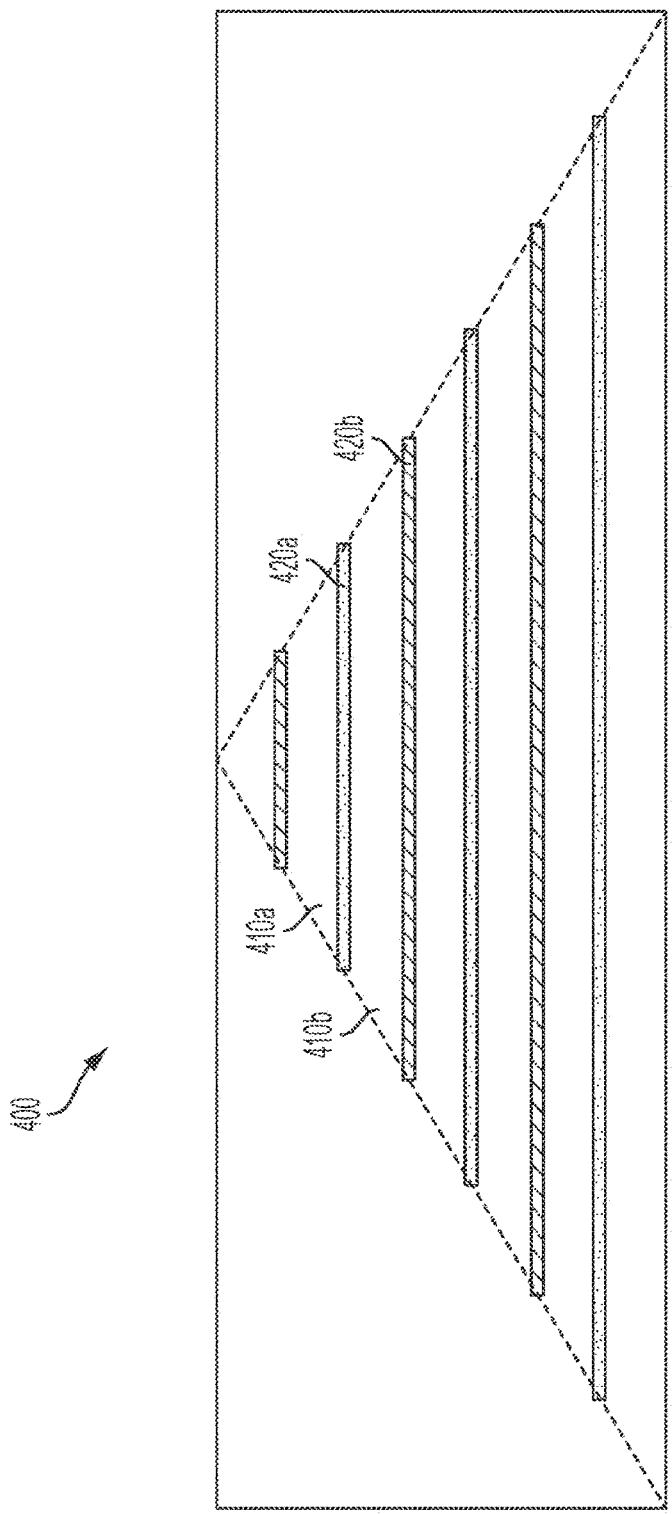

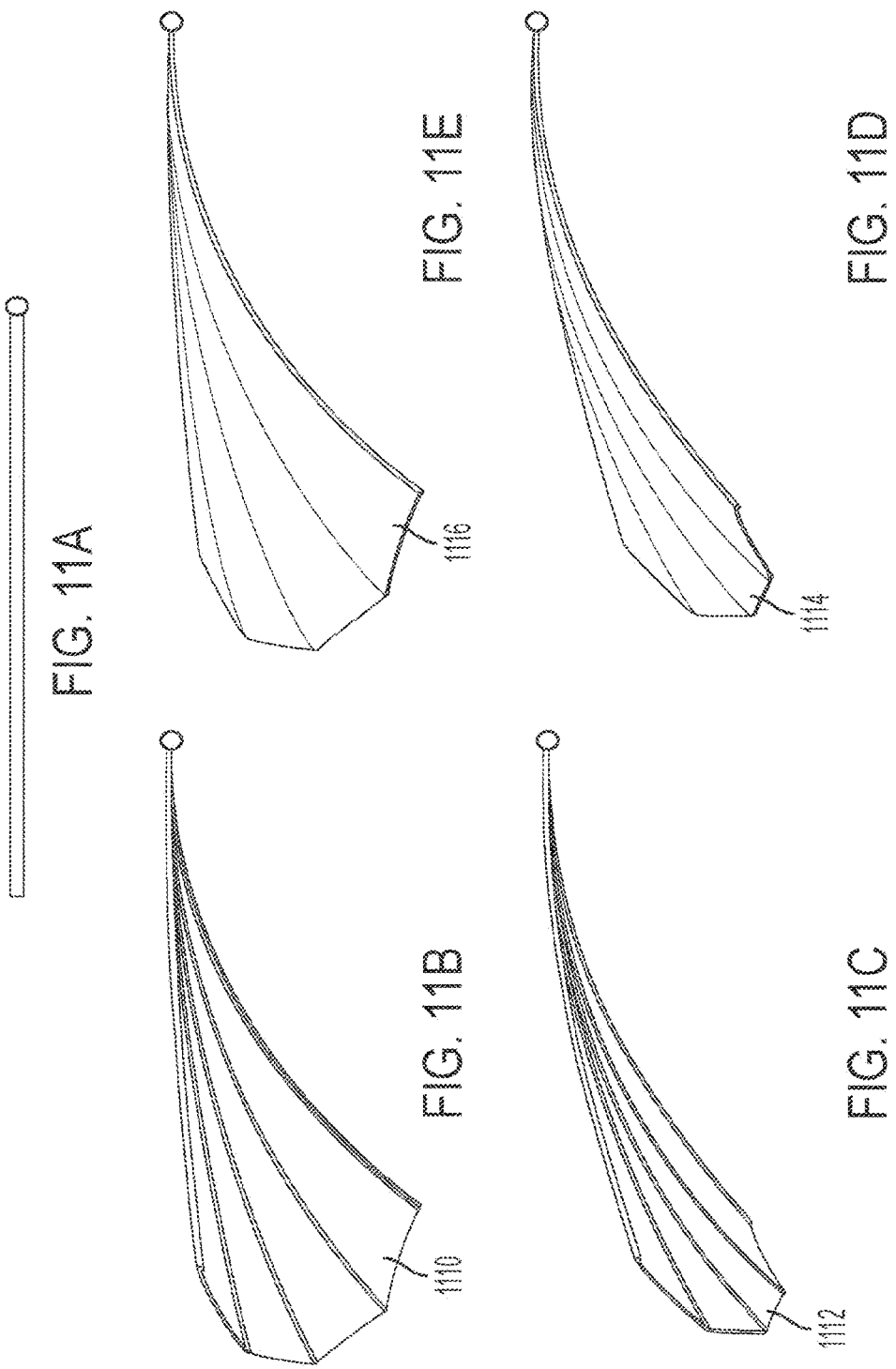

RECONFIGURABLE ELECTRICALLY CONTROLLED SHAPE MORPHING DIELECTRIC ELASTOMER DEVICE

RELATED APPLICATIONS

The application is a national stage filing under 35 U.S.C. § 371 of international application PCT/US2019/013220, filed Jan. 11, 2019, entitled "RECONFIGURABLE ELECTRICALLY CONTROLLED SHAPE MORPHING DIELECTRIC ELASTOMER DEVICE," which claims the benefit under 35 U.S.C. 119 (e) of the filing date of U.S. Provisional Application Ser. No. 62/616,739, filed Jan. 12, 2018, entitled "RECONFIGURABLE ELECTRICALLY CONTROLLED SHAPE MORPHING DIELECTRIC ELASTOMER DEVICE," the entire contents of each of which are incorporated herein by reference.

FEDERALLY SPONSORED RESEARCH

This invention was made with government support under 1333385 awarded by the National Science Foundation. The government has certain rights in the invention.

BACKGROUND

Mechanical devices, such as pumps, valves and bending beams, can be made of materials responsive to an electric field such that, when the devices are actuated by applying an electric field to electrodes located on the materials, the material changes thickness or undergoes shear in response to the applied electric field. Notably amongst these are devices made from piezoelectric and electrostrictive materials, arranged between parallel plate electrodes. Common piezoelectric and electrostrictive materials are oxides (e.g., polycrystalline oxides), and the dimensional changes produced when an electric field is applied are small. Larger dimensional changes can be produced when softer materials, such as elastomers and gels, are arranged between the electrodes in place of ceramic or hard polymer dielectrics, an example of which is shown in FIG. 1A.

As shown in FIG. 1B, when a voltage is applied to the electrodes, the opposite polarity electrodes attract one another with a force that depends on the electric field. This electrostatic force squeezes the dielectric material between the electrodes, decreasing the local thickness, and expanding the dielectric in the direction perpendicular to the electric field. Where there are no electrodes, the thickness of the dielectric layer does not change when a voltage is applied.

SUMMARY

Some embodiments are directed to an electrically-controllable shape morphing device. The electrically-controllable shape morphing device comprises a multi-layer structure including a plurality of elastomer layers and a plurality of electrode layers formed between the plurality of elastomer layers. A geometry and/or size of at least one electrode in a first layer of the plurality of electrode layers is different than a geometry and/or size of at least one other electrode in a second layer of the plurality of electrode layers, such that it provides a spatial gradient of electric field inside the elastomer. Each of the plurality of electrode layers is individually addressable such that the electrode layer is configured to receive a variable voltage, and the multi-layer structure is configured to change shape from a first shape to a second shape when a first differential voltage is applied between electrodes in the plurality of electrode layers. Some or all of the electrodes can be configured to receive a variable voltage, and the shape change of the multi-layer structure is configured to depend on a magnitude of the variable voltage applied to each of the electrodes. A sequence of shape change of the multi-layer structure may be configured to depend on a sequence of applying the variable voltage to each of the electrodes.

Other embodiments are directed to a method of shape morphing an electrically-controllable device comprising a multi-layer structure including a plurality of elastomer layers and a plurality of electrode layers formed between the plurality of elastomer layers, wherein a geometry and/or size of some or all electrodes in the plurality of electrode layers is different, wherein each of the plurality of electrode layers is individually addressable such that the electrode layer is configured to receive a variable voltage. The method comprises applying a differential voltage between electrodes to change a shape of the multi-layer structure from a first shape to a second shape.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

FIG. 4 schematically illustrates a design for an electrically-controllable shape morphing device in which a stack of electrodes is embedded in an elastomer material in accordance with some embodiments;

FIGS. 11A-11E illustrate time-sequential snapshots of a simulation during which the individually addressable sections of the electrically-controllable shape morphing device of FIG. 10A are actuated in sequence to provide a dynamic shape morphing device in accordance with some embodiments;

DETAILED DESCRIPTION OF INVENTION

Figure 1A:
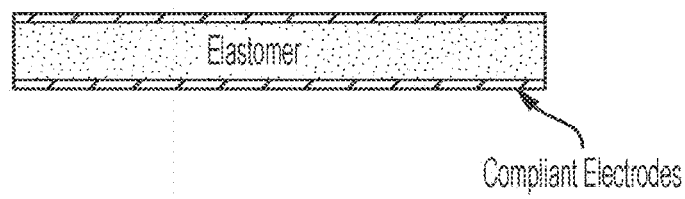
FIGS. 1A and 1B illustrate an electrically-controllable elastomer device with continuous electrodes to which a differential voltage may be applied.
Figure 1B:
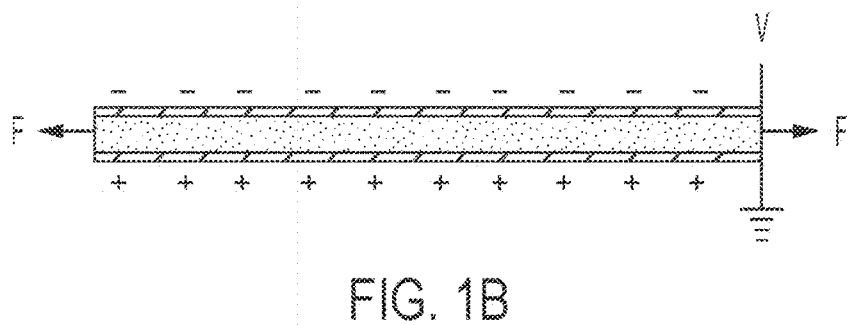

The inventors have recognized and appreciated that some conventional elastomer-based shape morphing devices are limited in their ability to produce complex shape changes. Such devices are typically only capable of creating rudimentary three-dimensional shapes (e.g., a bending beam) with the application of a voltage from an initial two-dimensional shape (e.g., a shape formed in a two-dimensional plane), and cannot create more complex three-dimensional shapes. Creating simple shapes, such as a bending beam, may be achieved when the elastomer sheet or film is attached (e.g., glued or grown on) to another, passive material, such as a beam or plate. Then, when an electric field is applied through the thickness of the dielectric, the composite beam, comprising the "active" material and the "passive" material, bends in proportion to the applied electric field. However, such devices are only capable of creating rudimentary three-dimensional shapes and are also not reconfigurable to enable the device to be reshaped when different electric fields are applied to different electrode arrangements within the device.

The inventors have recognized and appreciated that conventional shape morphing devices may be improved by designing the devices to have gradients in applied electric field and/or mechanical constraints. For example, some embodiments include a plurality of electrodes with circular shape and increasing radius, formed between a plurality of elastomer layers, which is configured to change shape from an initial flat shape to a dome-like shape, when a voltage is applied to the electrodes. Additionally, unlike conventional shape morphing devices in which the shape morphing is limited by the design, some embodiments are directed to electrically-controlled shape morphing devices that are reconfigurable based on the device design and applied voltage(s). Further some devices designed in accordance with some embodiments being electrically controlled, do not require external pneumatic or hydraulic power that some conventional shape morphing and soft robotic devices rely on to produce the shape changes. Reducing the requirements for actuating the device enables the device to be miniaturized for a wide range of applications, some examples of which are discussed below.

Some embodiments are directed to reconfigurable electrically-controlled devices that produce complex shapes using one or more of staggered electrodes, different shaped electrodes, and combinations of electrode arrangements/shapes and stiffening features, a configuration generally referred to herein as "meso-architecturing." Discussed in more detail below are non-limiting examples of types of electrically-controlled shape morphing devices in accordance with some embodiments. The examples illustrate how electric-field controlled shape morphing devices can be produced from a sheet of dielectric with different "meso-architectures." Some embodiments, examples of which are described below, include multi-layer structures in which a spatial variation in an applied electric field and/or designed mechanical anisotropy is introduced through the arrangement of different electrodes and/or local stiffening components embedded in the device that restrict the movement of the elastomer structure in particular ways when a voltage is applied. By applying a voltage to particular electrodes, the shape of the electrically-controlled device may be changed in different ways. By applying voltages to different sets of electrodes and in different temporal sequences, the shape morphing characteristics of the device can be reconfigured.

Figure 2A:
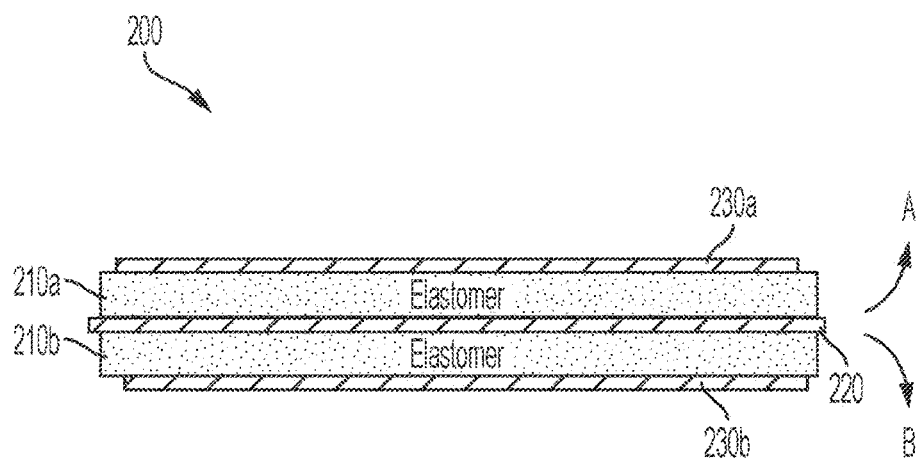
FIG. 2A illustrates an electrically-controllable shape morphing device capable of forming simple three-dimensional shapes.
Figure 2B:
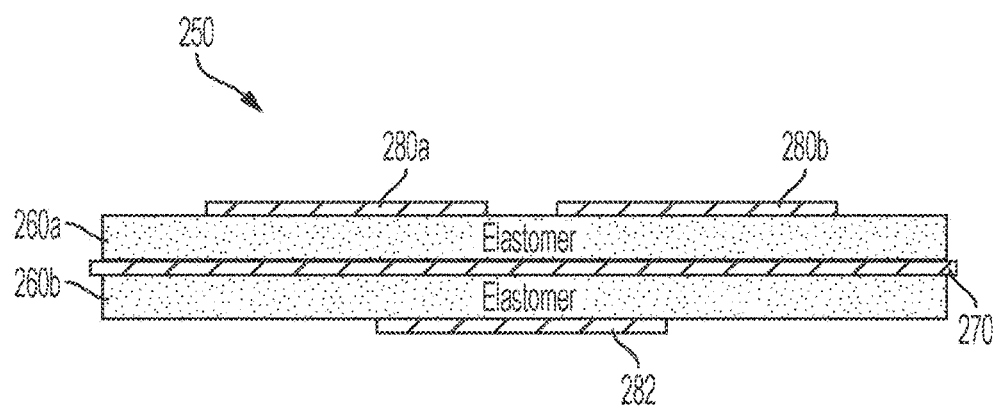
FIG. 2B illustrates another electrically-controllable shape morphing device capable of forming simple three-dimensional shapes.

FIGS. 2A and 2B illustrate examples of electrically-controllable shape morphing structures capable of producing simple shape changes. FIG. 2A shows a cross-section of a planar structure 200 in accordance with some embodiments. Planar structure 200 includes two sheets of elastomer 210a, 210b and a central electrode 220 arranged between the elastomer sheets. The planar structure also includes outer electrodes 230a, 230b arranged on a surface of the elastomer sheets 210a, 210b opposite the continuous electrode 220. As shown, in operation, when a voltage is applied to the top electrode 230a or the bottom electrode 230b relative to the central electrode 220, the planar structure 200 is actuated to bend down in direction B or to bend up in direction A, respectively, so that the planar structure 200 is configured to behave as a bimorph.

FIG. 2B illustrates another planar structure 250 capable of producing simple shape changes. Planar structure 250 includes elastomer layers 260a, 260b separated by central electrode 270. Planar structure 250 also includes a pair of upper electrodes 280a, 280b and a lower electrode 282, wherein the arrangement of the upper and lower electrodes are staggered to produce asymmetrical bending of the planar structure 250 upon actuation. Providing the top and bottom electrodes in a partially-overlapping staggered or "offset" configuration as shown in FIG. 2B enables the planar structure to be bent in multiple ways.

Figure 3A:
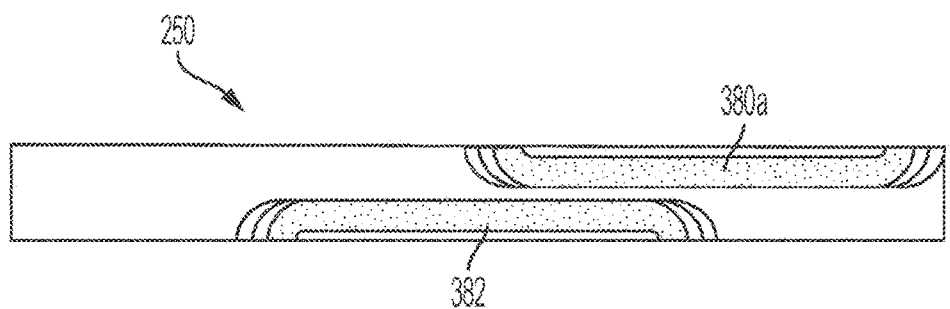
FIG. 3A schematically illustrates the device of FIG. 2B prior to actuation.
Figure 3B:
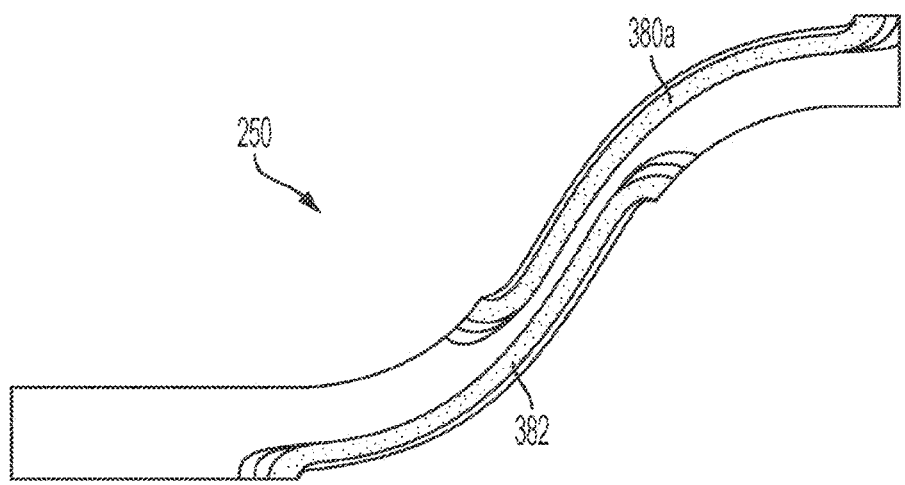
FIG. 3B illustrates the device of FIG. 2B upon actuation.

FIGS. 3A and 3B show two different actuation states of a portion of the planar structure 250 shown in FIG. 2B. FIG. 3A shows a first state prior to actuation and FIG. 3B shows a second state following actuation. The shaded regions 380a, 382 show the strength of the electric field. When a voltage is applied between the middle electrode 270 and the bottom electrode 282 and the top right electrode 280b, the electric field is as shown in FIG. 3A, which causes the deformation of the structure 250 as shown in FIG. 3B. As shown, when a voltage is applied to the electrodes, the structure bends in a third dimension out of the plane of the elastomer sheet. The bending and displacement into the third dimension is controlled by the magnitude of the voltage applied. When a voltage is applied between the middle electrode 270 and the bottom electrode 282 and the top left electrode 280*a*, the bending direction is reversed. The arrangement of overlapping electrodes introduces an inhomogeneity in the applied electric field by localizing the electric field where the electrodes overlap, thereby creating a bending effect.

As discussed above, the inventors have recognized and appreciated that conventional shape morphing devices are limited in their ability to create complex three-dimensional shapes. Accordingly, some embodiments are directed to apparatus and techniques for creating reconfigurable shape morphing devices capable of producing complex three-dimensional shapes through the use of individually-addressable electrodes with different geometry and/or size to create electric field gradients through elastomer layers and/or through the use of stiffening members that modify the local stiffness properties of the elastomer to effect shape changes. Some embodiments are directed to multi-layered structures which may be manufactured using any suitable multi-layering process including, but not limited to, spin coating, stamping, and additive manufacturing (e.g., 3D printing).

FIG. 4 schematically illustrates a cross-section of a multi-layer structure 400 of dielectric elastomer layers (e.g., 410*a*, 410*b*) alternating with electrodes (e.g., 420*a*, 420*b*) in accordance with some embodiments. The electrodes in multi-layer structure 400 may be implemented as thin disks having their centers aligned along a common vertical axis. As shown, the electrodes are stacked above one another and have a diameter that systematically varies with position in the stack. The electrodes are inter-digitated such that every other electrode in the stack is connected to a first voltage and the other set of alternating electrodes is connected to a second voltage (e.g., electrical ground) different from the first voltage. For example, a first set of electrodes in the stack may be coupled to electrical ground, whereas a second set of electrodes in the stack may be coupled to a fixed or variable voltage.

When a voltage (e.g., a positive voltage) is applied to one set of the alternating electrode layers in the stack of structure 400, the thickness of the dielectric elastomer layers decreases most in the center and least at the outside due to the electrical field gradient from the center of the disk to the outside edges. The variation in thickness with position depends on the angle the electrodes edges make with each other (the slope of their projection) and the applied voltage. In this way, the shape can be controlled by the combination of the value of the applied voltage and the geometry of the electrodes.

Figure 5A:
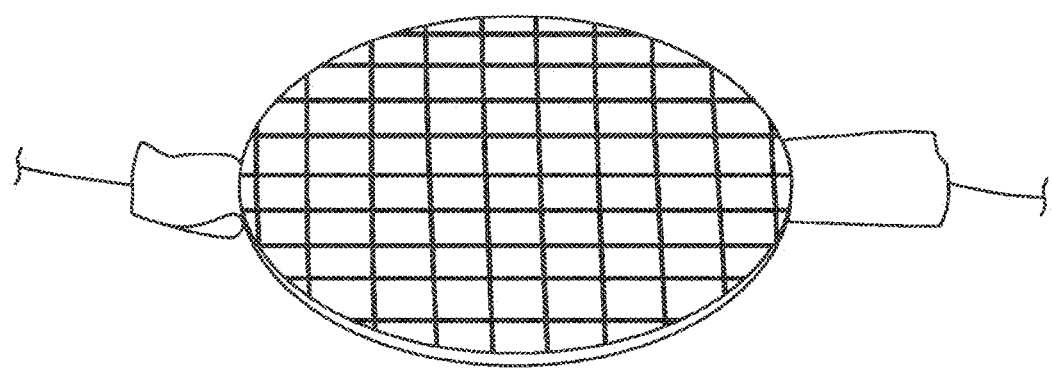
FIG. 5A illustrates an electrically-controllable shape morphing device created based on the design shown in FIG. 4, in the absence of providing a differential voltage across the electrode layers.
Figure 5B:
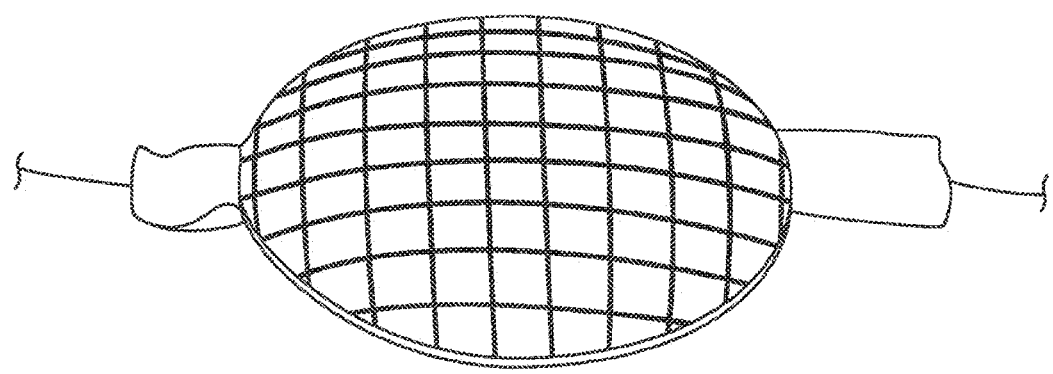
FIG. 5B illustrates the device of FIG. 5A when a differential voltage is applied across the electrode layers.

FIGS. 5A and 5B show two actuation states of structure 400 when a voltage is applied to electrodes shown in the flat disk design of FIG. 4. FIG. 5A shows the flat elastomer/electrode disk structure of FIG. 4 when no voltage is applied to the electrodes. As shown in FIG. 5B, when a voltage is applied to the alternating sets of electrodes, as described above, the originally flat disk curves upwards to form a three-dimensional dome-like shape, with the thinning of the elastomer being maximal at the center of the disk due to the larger magnitude of the electric field gradient between the electrodes at that point.

A non-limiting application of the bowl-shaped structure shown in FIG. 5 is using an array of the structures, where each structure in the array can be individually activated to create a readable braille pad whose text could be changed in real time according to voltage signals communicating the text. In some embodiments, a surface is coated with a reflective coating, and the reflectivity of the surface is modulated or modified in response to appropriate voltage input signals to produce a reconfigurable reflective display.

Figure 6:
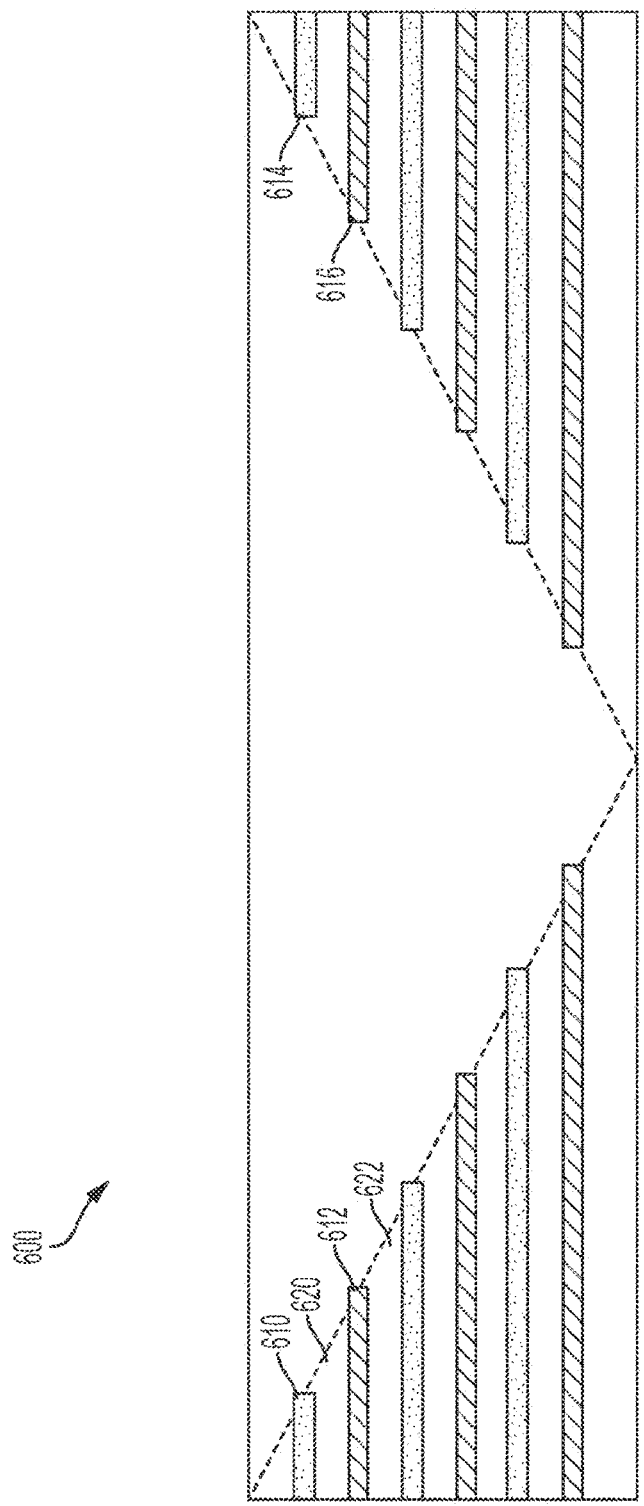
FIG. 6 schematically illustrates a design for an electrically-controllable shape morphing device in which quadrants are separated into individually addressable segments in accordance with some embodiments.

FIG. 6 schematically illustrates an elaboration of the design shown in FIG. 4, in which the flat disk is sectioned into individually-addressable quadrants of the electrode stack (The quadrants are seen when viewed from the top of the disk). By dividing the disk into quadrants, even more complex shapes may be created and/or the different quadrants can be activated in a temporal sequence to provide a dynamically-changing shape.

FIG. 6 shows a cross-section of a multi-layer structure 600 of dielectric elastomer layers (e.g., 620, 622) alternating with electrodes (e.g., 610, 612) within one quadrant of the structure 600, in accordance with some embodiments. As shown, a second quadrant of the flat disk structure 600 also includes dielectric elastomer layers alternating with electrodes (e.g., 614, 616). As shown, within each quadrant, the electrodes are stacked above one another and have a diameter that systematically varies with position in the stack. The electrodes are inter-digitated such that every other electrode in the stack is connected to a first voltage and the other set of alternating electrodes is connected to a second voltage (e.g., electrical ground) different from the first voltage. Electrodes in one quadrant of the structure may be connected to the same or a different voltage as the electrodes in one or more other quadrants of the structure. As an example, FIG. 6 shows a first set of electrodes (e.g., 610, 614) configured to be connected to a first voltage and a second set of electrodes (e.g., 612, 616) connected to be connected to a second voltage.

Figure 7A:
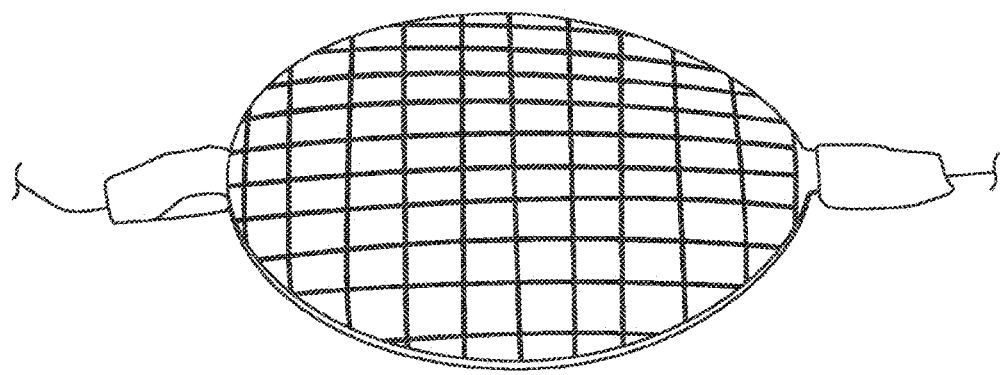
FIG. 7A illustrates an electrically-controllable shape morphing device created based on the design shown in FIG. 6, in the absence of providing a differential voltage across the electrode layers.
Figure 7B:
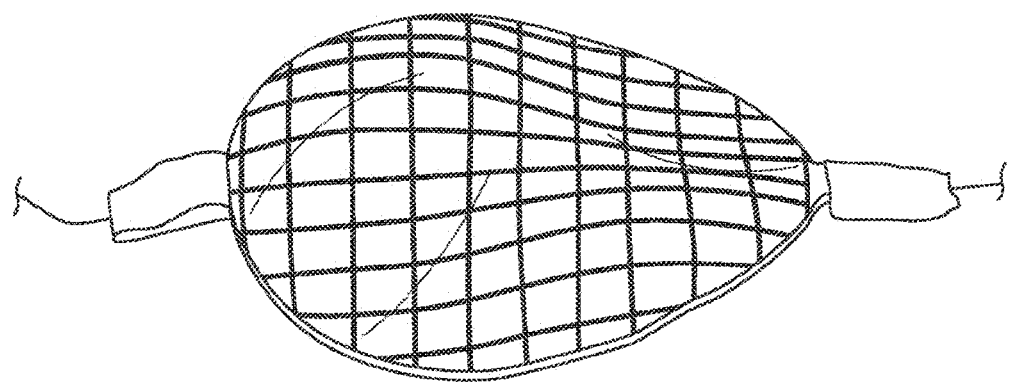
FIG. 7B illustrates the device of FIG. 7A when a differential voltage is applied across the electrode layers.

FIGS. 7A and 7B show two actuation states of structure 600 shown in the design of FIG. 6. FIG. 7A shows the elastomer/electrode disk structure of FIG. 6 when no voltage is applied to the electrodes. As shown in FIG. 7B, when a voltage is applied to the alternating sets of electrodes, as described above, the shape of the disk curves to form a 3D saddle-like shape due to the electrical field gradient induced by actuating the electrodes arranged in the particular arrangement shown in FIG. 6.

In the embodiments described above, complex three-dimensional shape morphing is achieved through the arrangement and selective application of voltages to electrodes embedded in a multi-layer elastomer structure. In such embodiments, the stiffness of the elastomer substrate is considered to be approximately uniform. The inventors have recognized that additional control over the ability of some embodiments to produce reconfigurable complex three-dimensional shapes is to change the mechanical properties of the elastomer material by altering the local stiffness of the elastomer through the use of stiffening structures embedded within the elastomer material.

Figure 8:
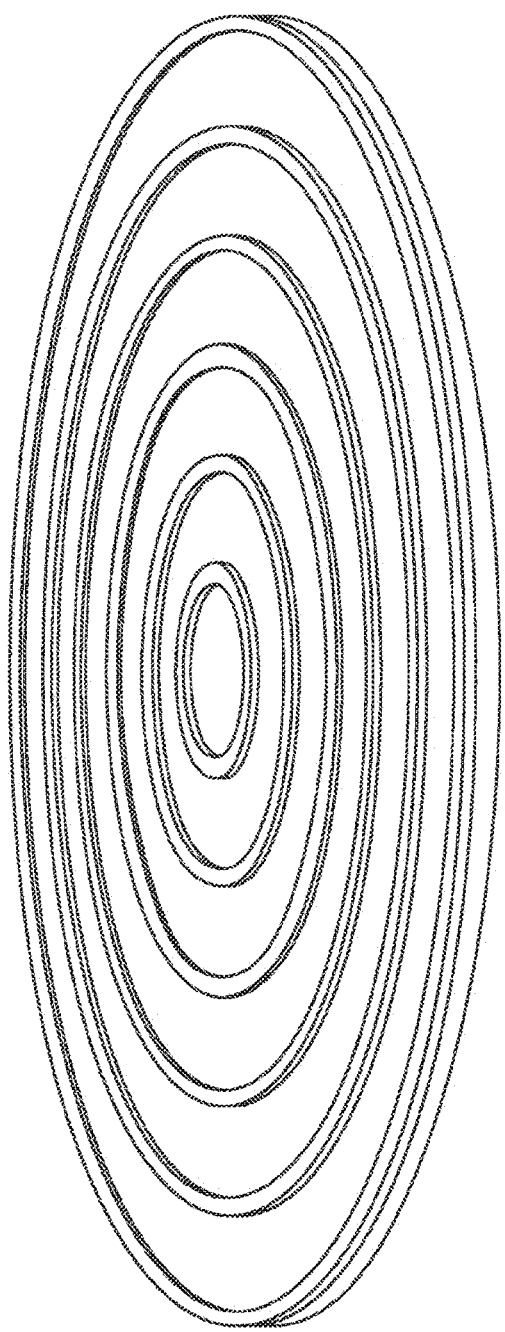
FIG. 8 illustrates an electrically-controllable shape morphing device in which stiffening elements are associated with the device in accordance with some embodiments.

FIG. 8 illustrates an example of using meso-architecturing using stiffening features to create electrically-controllable shape morphing devices in accordance with some embodiments. As shown in FIG. 8, a structure including a thin dielectric elastomer layer and upper and lower continuous electrodes formed thereon has a set of stiff rings affixed to one side of the electrically-controlled device. The stiff rings may be made of any suitable material having a stiffness greater than the stiffness of the elastomer. For example, the rings may be made of Mylar or some other suitable material. In some embodiments, the stiffness of the rings is 10-100 times stiffer than the stiffness of the elastomer. The rings may be affixed to one side of the electrically-controlled device using any suitable fixation technique including but not limited to, gluing and depositing (e.g., using an additive manufacturing or other depositing technique). Alternatively, the stiff rings may be embedded in the elastomer material. For example, the rings may be formed between two layers of elastomer material in a multi-layer structure. The electrically-controlled device may be attached to a stiff outer ring to prevent expansion of the ring when activated.

When a voltage is applied to the electrodes formed on either side of the elastomer disk, the elastomer expands and, being constrained by the outer ring, deflects out of plane to create a dome shape. The stiff rings change the local stiffness of the elastomer at the interface between the ring and the elastomer. Without the set of concentric stiff rings, the elastomer material would wrinkle around its periphery. The stiff rings affixed to the electrically-controlled structure help prevent the wrinkling instability when a differential voltage is applied to the structure. The deflection of the dome increases with increasing applied electrical voltage. When the voltage is turned off, the elastomer returns to its initial flat state.

Figure 9A:
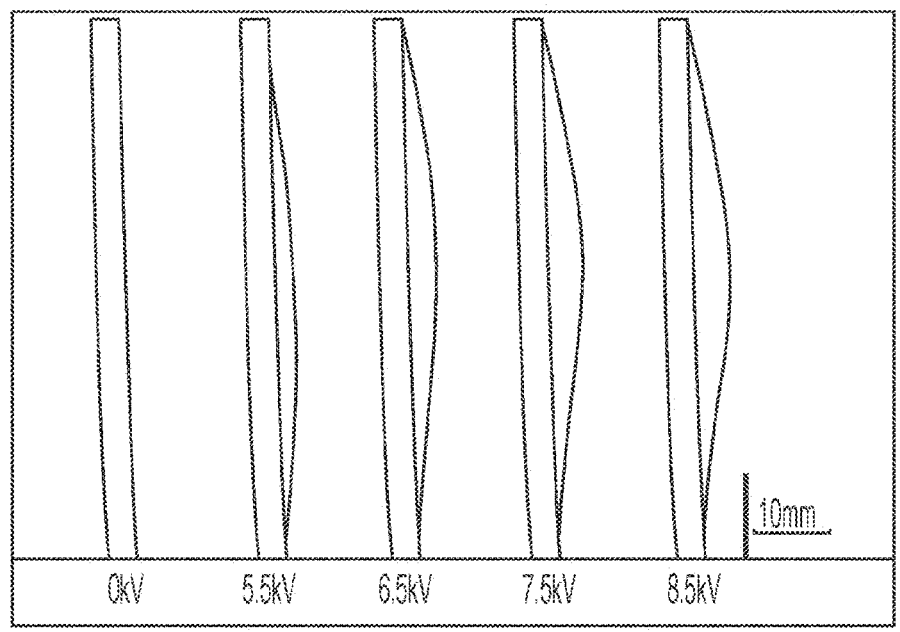
FIG. 9A illustrates how the electrically-controllable shape morphing device of FIG. 8 changes shape when different voltages are applied to the electrodes of the device.
Figure 9B:
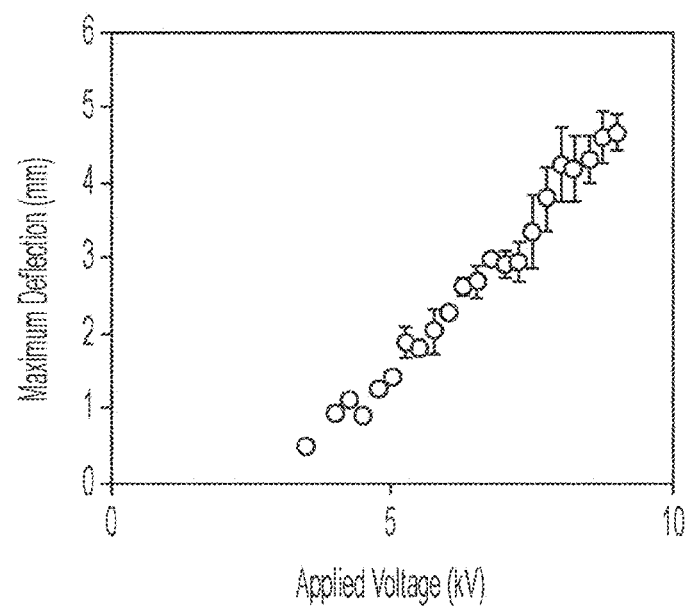
FIG. 9B is a plot of the maximum deflection of the electrically-controllable shape morphing device of FIG. 8 when different voltages are applied to the electrodes of the device.

FIG. 9A shows a sequence of images of a side view of the electrically-controlled ring structure shown in FIG. 8 as a function of the applied voltage. With increasing voltage, the deflection of the elastomer increases. FIG. 9B shows that the maximum value of the deflection is between 4-5 mm at an applied voltage of approximately 9 kV. When the voltage is turned off, the elastomer returns to being flat and cannot be distinguished from the top surface of the ring.

Other non-limiting examples of applications for some embodiments include use as a dynamically-controllable mechanical activation switch, use as a reconfigurable acoustic speaker, and as a reconfigurable portion of a wall inside a channel to adjust a flow rate of a fluid flowing through the channel, for example, in a microfluidic system.

In the preceding examples, the meso-architectural features—the stiff rings—were axially symmetrical and consequently, the electrically-controlled morphing produced shapes that were also symmetrical. Some embodiments are directed to producing more complex morphing shapes by fewer and/or non-symmetrical arrangements of electrodes and stiffening features. Furthermore, by altering the sequence in which individually-addressable electrodes are activated, the shapes can be altered and varied as a function of time.

Figure 10A:
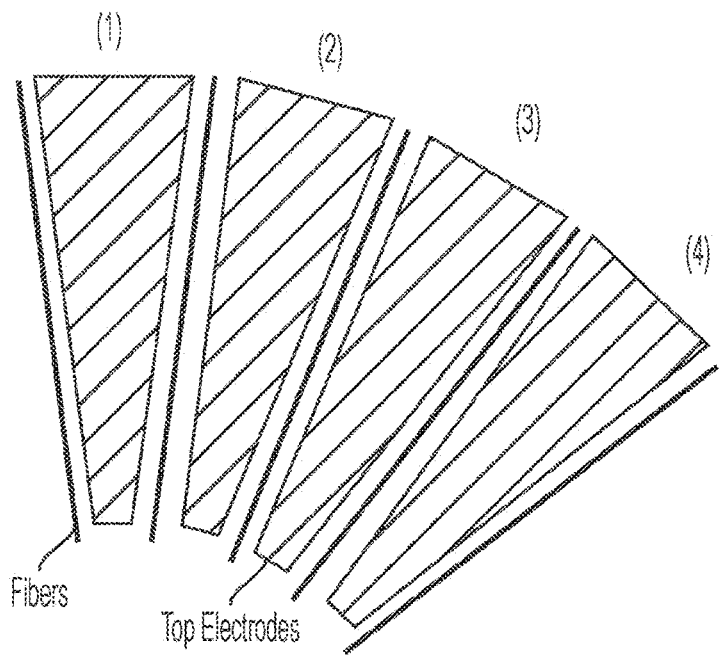
FIG. 10A illustrates an electrically-controllable shape morphing device that includes an electrode having individually addressable sections and stiff elements in accordance with some embodiments.
Figure 10B:
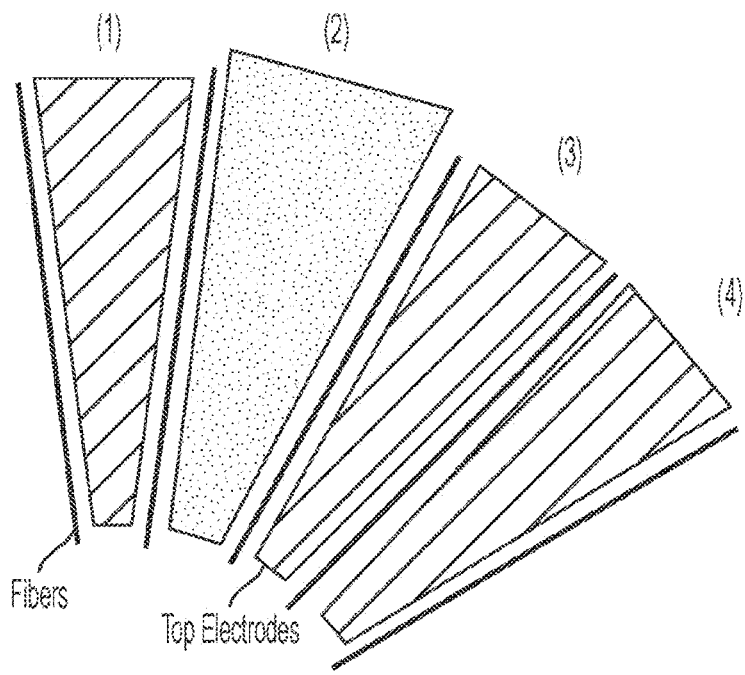
FIG. 10B illustrates the electrically-controllable shape morphing device of FIG. 10A when one of the individually addressable sections is actuated.

FIGS. 10A and 10B illustrate an example of a complex shape that can be produced in accordance with some embodiments. As shown in FIG. 10A, prior to actuation, the dielectric elastomer shape comprises a flat elastomer sheet separated into four segments of approximately equal size separated by stiff fibers or "ribs." A continuous electrode is formed on the bottom side of the elastomer structure, whereas a segmented electrode is formed on the top side of the elastomer structures such that each of the segments (1)-(4) can be individually addressed.

FIG. 10B shows that when a voltage is selectively applied to segment (2), the segment increases its area but is constrained radially by the stiff fibers arranged between the segments. The radial constraint also produces a bending of the structure. Applying an activation voltage to each segment in turn causes the segments to create a simple flapping motion. A distributed set of accelerometers and pressure sensors, as well as distributed interconnects, may be incorporated for adaptively changing the shape and for sequentially addressing individual actuation segments.

FIGS. 11A-E show snapshots of the four-segment "wing" of FIGS. 10A, 10B taken from a finite-element simulation viewed from the front. FIG. 11A shows the initial, unactuated flat "wing" hinged at the right hand end. FIG. 11B shows that when a first segment 1110 is actuated, the "wing" bends down and twists. FIG. 11C shows that when a second segment 1112 is actuated, the "wing" begins to twist further but with less bending. FIG. 11D shows that when a third segment 1114 is actuated, the "wing" has twisted further so only the top side of the "wing" is seen in this projection. FIG. 11E shows that when a fourth segment 1116 is actuated, the "wing" has twisted further. When no voltage is applied, the "wing" returns to its flat, initial state as shown in FIG. 11A. The stiffening ribs, which are located on the underside of the "wing" in the simulations shown in FIGS. 11A-11E are shown between the segments 1110, 1112, 1114, 1116. The simulations were performed using finite element methods employing ABAQUS.

Figure 12A:
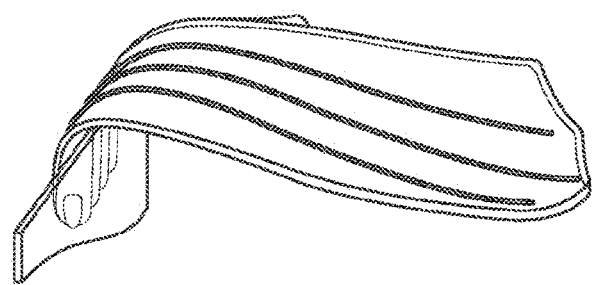
FIGS. 12A-12E illustrate time-sequential snapshots of actuation of different segments of an electrically-controllable shape morphing device created based on the design of FIG. 10A.
Figure 12B:
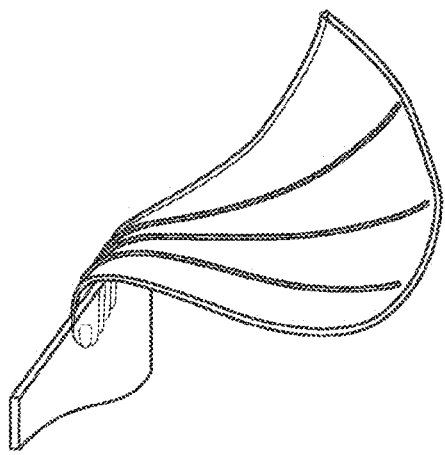
Figure 12E:
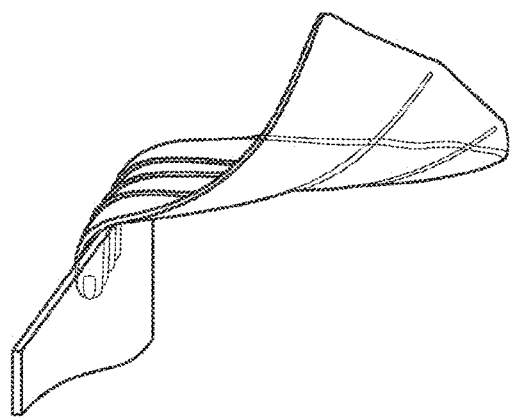
Figure 12C:
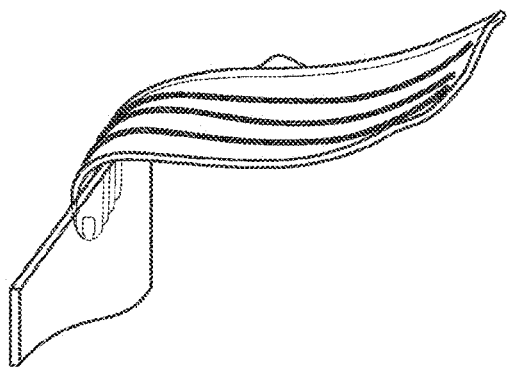
Figure 12D:
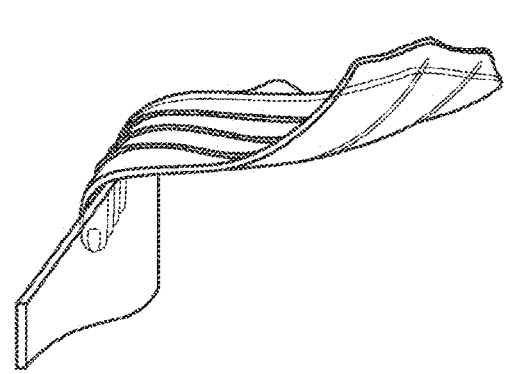

FIGS. 12A-E show time-sequential snapshots of the four-segment "wing" of FIGS. 10A, 10B as the segments of the wings are actuated. FIG. 12A shows the initial, unactuated "wing" hinged at the left-hand end. FIG. 12B shows that when a first segment is actuated, the "wing" twists. FIG. 12C shows that when a second segment is actuated, the "wing" begins to twist further but with less bending. FIG. 12D shows that when a third segment is actuated, the "wing" has twisted further. FIG. 12E shows that when a fourth segment is actuated, the front tip of the "wing" has twisted even further. When no voltage is applied, the "wing" returns to its initial state as shown in FIG. 12A. The stiffening ribs, which are located on the underside of the "wing" in the device of FIGS. 12A-12E are arranged between the individually-addressable segments.

Figure 13A:
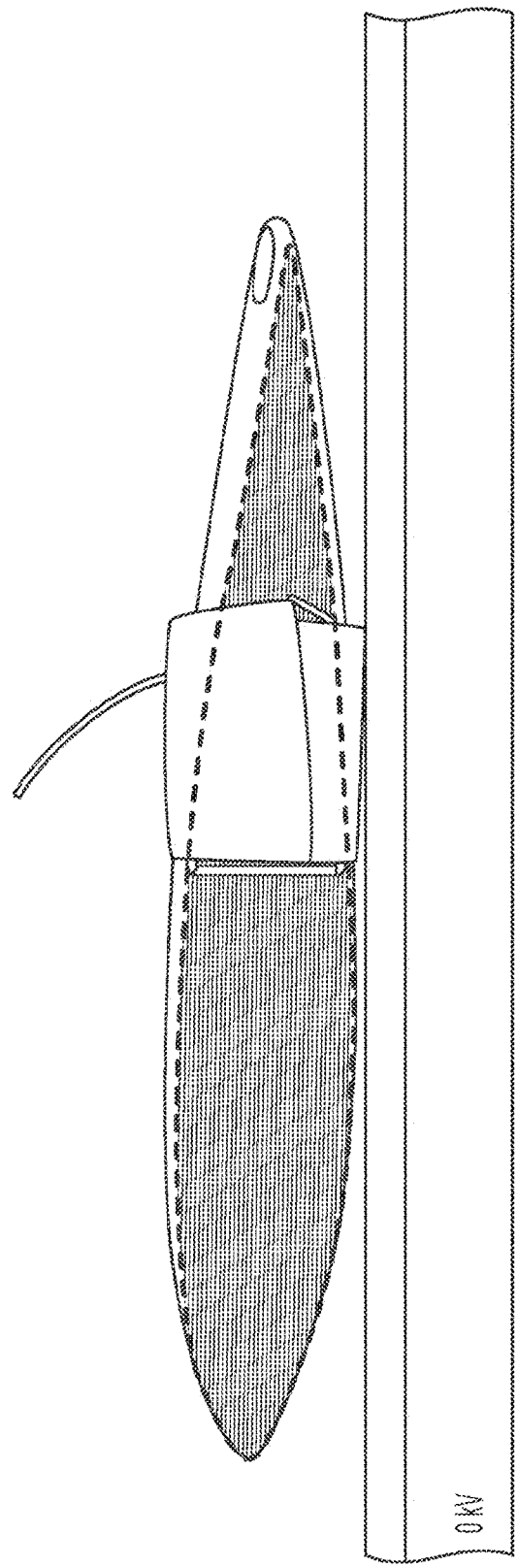
FIGS. 13A and 13B illustrate an electrically-controllable shape morphing device in which the initial shape is more complex.
Figure 13B:
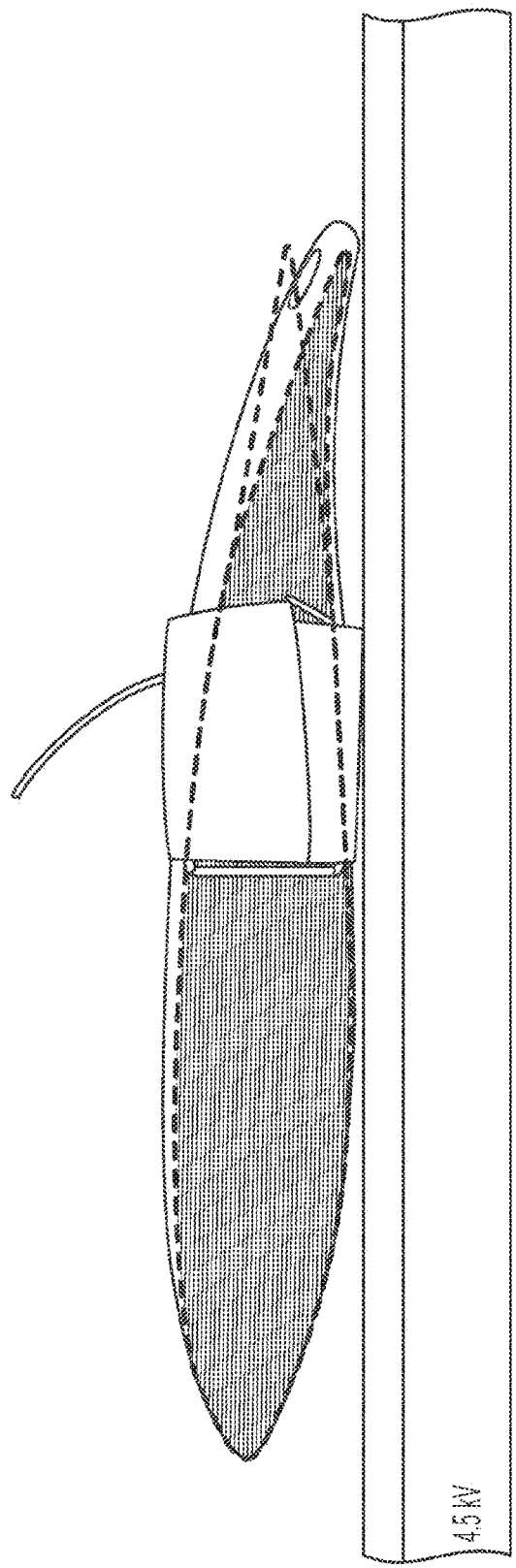

FIGS. 13A and 13B illustrate a shape morphing device in which the initial shape is more complex than a flat object. In this illustrative example, the initial shape of the device is that of an air foil.

Some non-limiting applications for which some embodiments that provide dynamically-activated shape changing structures include the use as wings on flying objects and fins on swimming objects (e.g., electrically controlled fish). Unlike conventional soft robotics structures that are an amalgam of parts connected using non-configurable hinges and joints, some embodiments may be monolithically integrated through a combination of driving elements (e.g., electrical control signals), the response of the system (e.g., via electrode placement and stiffening elements), and/or one or more sensors. For example, some embodiments may be constructive using an additive manufacturing process.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The invention claimed is:

1. An electrically-controllable shape morphing device, comprising:
    a multi-layer structure including a plurality of elastomer layers and a plurality of electrode layers formed between the plurality of elastomer layers;
    wherein a geometry and/or size of at least one electrode in a first layer of the plurality of electrode layers is different than a geometry and/or size of at least one other electrode in a second layer of the plurality of electrode layers,
    wherein the first layer of the plurality of electrode layers and the second layer of the plurality of electrode layers are positioned in the multi-layer structure,
    wherein a first electrode layer of the plurality of electrode layers includes multiple electrodes, and wherein at least some of the multiple electrodes are individually addressable such that the at least some of the multiple electrodes are configured to receive a variable voltage, and
    wherein the multi-layer structure is configured to change shape from a first shape to a second shape when a first differential voltage is applied between electrodes in the plurality of electrode layers.

2. The electrically-controllable shape morphing device of claim 1, wherein the multi-layer structure has the first shape in an absence of the first differential voltage being applied between the electrodes, and
    wherein the multi-layer structure is configured to return to the first shape in the absence of the first differential voltage being applied between the electrodes.

3. The electrically-controllable shape morphing device of claim 1,
    wherein some or all of the electrodes are configured to receive a variable voltage, and
    wherein the shape change of the multi-layer structure is configured to depend on a magnitude of the variable voltage applied to each of the electrodes.

4. The electrically-controllable shape morphing device of claim 1,
    wherein some or all of the electrodes are configured to receive a variable voltage,
    wherein the shape change of the multi-layer structure is configured to depend on a timing of applying the variable voltage to each of the electrodes, and
    wherein a sequence of shape change of the multi-layer structure is configured to depend on a sequence of applying the variable voltage to each of the electrodes.

5. The electrically-controllable shape morphing device of claim 4, further comprising a controller configured to time-sequentially apply the variable voltage between the electrodes such that the shape of the multi-layer structure changes from the first shape to the second shape to a third shape in time.

6. The electrically-controllable shape morphing device of claim 1, wherein some or all of the plurality of electrode layers comprise a plurality of individually-addressable electrode sections separated by gaps.

7. The electrically-controllable shape morphing device of claim 1, wherein each electrode layer partially overlaps adjacent electrode layers when viewed in a cross-section of the multi-layer structure.

8. The electrically-controllable shape morphing device of claim 1, further comprising at least one stiffening element formed on or within at least one of the plurality of elastomer layers, wherein the at least one stiffening element is configured to alter at least one local mechanical property of the at least one of the plurality of elastomer layers on or within the at least one of the plurality of elastomer layers in which it is formed.

9. The electrically-controllable shape morphing device of claim 8, wherein the at least one stiffening element comprises a plurality of concentric rings.

10. The electrically-controllable shape morphing device of claim 9, wherein the second shape is a dome shape.

11. A method of controlling an electrically-controllable device comprising a multi-layer structure including a plurality of elastomer layers and a plurality of electrode layers formed between the plurality of elastomer layers, wherein a first layer of the plurality of electrode layers includes a first electrode and a second electrode that are individually addressable, the method comprising:
   applying a first voltage to the first electrode of the first layer of the plurality of electrode layers;
   applying a second voltage to the second electrode of the first layer of the plurality of electrode layers; and
   applying a third voltage to a second layer of the plurality of electrode layers, wherein applying the first voltage to the first electrode, applying the second voltage to the second electrode, and applying the third voltage to the second layer causes a shape of the multi-layer structure to change from a first shape to a second shape,
   wherein a geometry and/or size of at least one electrode in the first layer is different than a geometry and/or size of at least one other electrode in the second layer, and
   wherein the first layer of the plurality of electrode layers and the second layer of the plurality of electrode layers are positioned in the multi-layer structure.

12. The method of claim 11, further comprising:
   removing the first voltage applied to the first electrode, the second voltage applied to the second electrode, and the third voltage applied to the second layer to return the multi-layer structure to the first shape.

13. The method of claim 11, wherein the first shape is a two-dimensional shape and the second shape is a three-dimensional shape.

14. The method of claim 11, further comprising applying different voltages to different electrodes.

15. The method of claim 11, further comprising:
   time-sequentially applying a sequence of variable voltages between different electrodes in the plurality of electrode layers to change a shape of the multi-layer structure from the first shape to the second shape to a third shape in time sequence.

16. The method of claim 15, further comprising applying different voltages to different electrodes.

17. The method of claim 11, wherein the multi-layer structure further includes at least one stiffening element attached on or within the plurality of elastomer layers to locally alter a mechanical stiffness of the multi-layer structure in an at least one direction.

18. An electrically-controllable shape morphing device, comprising:
   a multi-layer structure including a plurality of dielectric elastomer layers and a plurality of electrode layers formed between the plurality of dielectric elastomer layers;
   wherein a geometry and/or size of at least one electrode in a first layer of the plurality of electrode layers is different than a geometry and/or size of at least one other electrode in a second layer of the plurality of electrode layers,
   wherein the first layer of the plurality of electrode layers and the second layer of the plurality of electrode layers are positioned in the multi-layer structure, and
   wherein the multi-layer structure is configured to change shape from a first shape to a second shape when a first differential voltage is applied between electrodes in the plurality of electrode layers.

* * * * *